Jan. 27, 1948.   D. H. QUINN   2,434,958
WATER PURIFIER
Filed Feb. 25, 1944
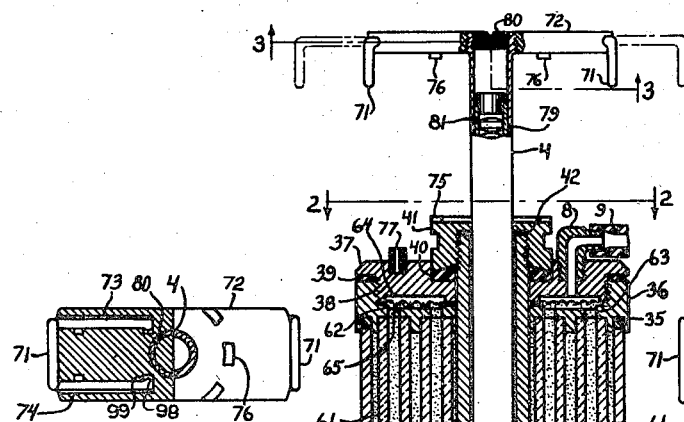
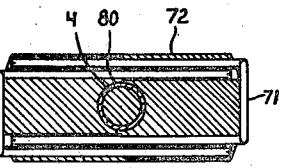
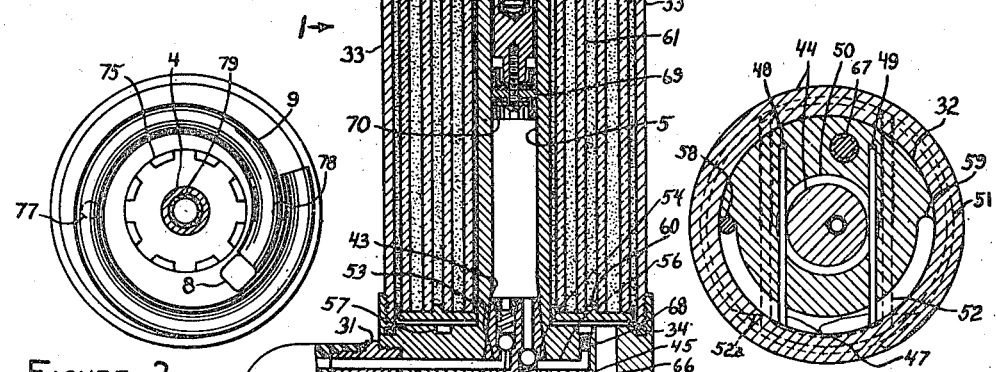
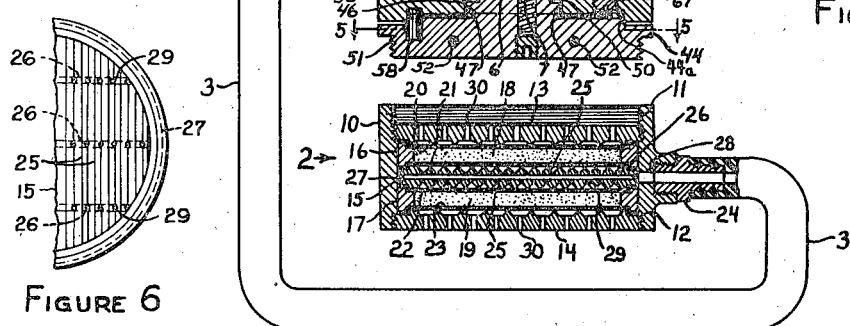
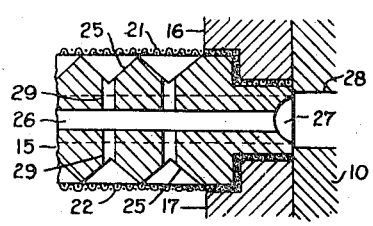
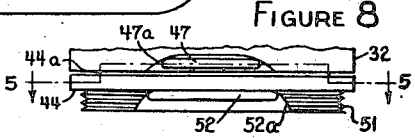
FIGURE 3
FIGURE 4
FIGURE 2
FIGURE 5
FIGURE 6
FIGURE 1
FIGURE 8
FIGURE 7
INVENTOR
DAVID H. QUINN
BY W. Glenn Jones
ATTORNEY Patented Jan. 27, 1948

2,434,958

UNITED STATES PATENT OFFICE 2,434,958

WATER PURIFIER

David H. Quinn, United States Navy

Application February 25, 1944, Serial No. 523,843

18 Claims. (Cl. 210—112)

(Granted under the act of March 3, 1883, as amended April 30, 1928; 370 O. G. 757)

This invention relates to water purifying equipment, and in particular to such equipment as will provide water for drinking purposes from water which would otherwise be unfit to drink because of pollution.

The provision of pure drinking water is always a factor which must be considered during military operations. Troops in the field are often separated from their source of supply of pure drinking water. The small amount of water that each man can carry in his canteen is not sufficient to last him for more than a short time. When this has been used, the men are sorely tempted to drink water from any source even though they know that it is contaminated. Normally, such contaminated water is fairly abundant, and in order to assuage their thirst the men will drink it even against their better judgment. Almost invariably they will become ill and unfit for duty, and some fatalities result.

The purifying equipment which is the subject of this invention is particularly adaptable to be constructed of small size so that it can be carried by an individual as an article of equipment. A model approximately seven and one-half inches long and two and one-fourth inches in diameter, which weighs approximately one pound complete, has been found to remove 100% of the bacteria, turbidity, odor and taste from a sample of highly polluted water. This small model purified more than five gallons of water before a cleaning operation was necessary. The unit is designed to be easily dismantled for cleaning, which operation takes approximately five minutes. Due to its small size and light weight, the purity of its effluent, and ease of cleaning, the unit can be easily carried by a soldier in combat or patrol operations, and he will always have with him means for supplying himself with pure drinking water. While the equipment forming the subject of the present invention was designed primarily to fulfill the need of troops it is to be understood that it is equally useful to campers and the like, and that the dimensions given above are not limiting but by way of example. Larger units, having greater capacity and a longer life between cleaning operations are within the scope of the invention.

It is the primary object of my invention to provide an improved portable water purifying equipment which is capable of complete purification of water for drinking purposes, and which is easily dismantled for cleaning purposes.

Another object of my invention is the provision of a portable water purifying equipment comprising two treating units, one of which is immersed in the body of water from which the supply is drawn, and the other of which is a unit from which the purified water is discharged under pressure, there being a pump to suck water through the immersed unit and force it through the second or discharge unit. When not in use the two units are screwed together to conserve space and to make an easily carried unit of equipment.

Other objects will become apparent as the description proceeds in connection with the annexed drawings, in which:

Fig. 1 is a sectional view in side elevation of the complete equipment, the section shown being in a vertical plane passing through the longitudinal axis thereof;

Fig. 2 is a partial plan view of the equipment substantially along the line 2—2 of Fig. 1 but showing the flexible outlet hose coiled, and with its connection in its true relationship with respect to the top of the unit rather than as shown in Fig. 1 where it is slightly rotated and displaced for purpose of illustration.

Fig. 3 is a partial sectional view of the handle, taken along the line 3—3 of Fig. 1, and looking in the direction of the arrows;

Fig. 4 is a sectional view similar to Fig. 3 of a modified handle, but taken on a plane passing completely through the handle instead of only to the axis of the pump shaft as is Fig. 3;

Fig. 5 is a sectional view along the line 5—5 of Fig. 1 on line 5—5 of Fig. 8 and looking in the direction of the arrows.

Fig. 6 is a partial plan view of the central drainage member and support shown in section in Fig. 1.

Fig. 7 is a considerably enlarged view of a portion of the right end of the central drainage member and support shown in section in Fig. 1.

Fig. 8 is a front elevation of the lower portion of the main filtering unit shown in section in Fig. 1.

As shown in Fig. 1 the assembly comprises a main filter unit 1 and a pre-filter unit 2 connected by a length of flexible conduit or hose 3. During filtering operations, the water is drawn through the filters in unit 2 by pulling up on a pump shaft 4 in the main filter unit 1. The water passes from the pre-filter 2 through the hose 3 and into a pump cylinder 5. The water is retained in the barrel 5 by a one way check valve 6 until the pump shaft 4 is given a down stroke whereupon the water passes through another check valve 7 to the filters in the main filter unit 1 and thence through an effluent fitting 8. A length of flexible hose 9 is attached to the fitting 8 to deliver the purified water to a suitable receptacle. In Fig. 1 the pre-filter unit is shown disassembled from the main filter unit, which is the condition when water is being purified, since the prefilter is then immersed in the pool or other source of water. When the apparatus is not in use, however, the pre-filter unit is attached to and carried by the main filter unit, as will be described later.

The pre-filter unit 2 comprises a cylindrical housing 10 having internal threaded portions 11 and 12 respectively at each end. The portion 11 is longer than the portion 12 for a purpose to be described. A pair of perforated disc shaped supports 13 and 14 are threaded into the portions 11 and 12 and clamp between them a pair of assembled filter units which are separated by a common disc shaped drainage member and support 15. Each filter unit comprises a pair of ring like spacers 16 and 17 which are clamped between the support and drainage member 15 and each perforated support 13 and 14, thus providing spaces 18 and 19 respectively which are filled with very fine loose filtering material, such as diatomaceous earth.

In order to confine the fine material in the spaces 18 and 19, very fine mesh metal screens or porous supports or the like 20, 21, 22, and 23 are clamped between spacer 16 and supports 13 and 15, and between spacer 17 and supports 14 and 15. By way of example, the screens 20—23 may be of 325 mesh "Monel" metal when the fine material confined therebetween is diatomaceous earth. The drainage member 15 separates and keeps the two interior screens 21 and 22 from collapsing against each other from the pressure, and also provides a drainage or effluent channel leading to a discharge fitting 24 to which the hose 3 is attached. As shown in Fig. 1 and Fig. 7 the drainage and support member 15 has ridges or projections 25 on each side which support the screens 21 and 22. One or more internal passageways 26 communicate with an annular groove 27 on the periphery of the support, the groove 27 being in communication with a passageway 28 which is connected to the discharge fitting 24. The water which passes through screens 21 and 22 into the valleys between the projections 25 passes into the passageways 26 and the annular groove 27 by means of passages 29 leading from each such valley.

The outside surfaces of the perforated supports 13 and 14 are substantially flat, but their interior surfaces are provided with concentric annular ridges which support the screens 20 and 23 as during backwashing. The valleys between the ridges communicate with the outside of the unit or housing through holes 30 passing through the supports 13 and 14, there being at least one hole for each such valley.

The hose 3 is slipped over an inlet fitting 31 in a base portion 32 of the main filter unit 1. The base portion 32 is shown to be integral with the pump cylinder 5, but they may be made separately and locked in fixed relationship. An exterior tubular casing 33 is threaded into the base 32 and sealed by a gasket 34. The upper end of casing 33 is seated against a gasket 35 in annular groove of a lower head member 36. The head 36 has a sliding fit over the pump cylinder 5. An upper head member 37 is attached to the top of the lower head 36 by means of mating threaded portions 38, there being opposing flanges on heads 36 and 37 between which a gasket 39 is compressed. The head 37 similarly has a sliding fit over the pump cylinder 5, and also has a central annular groove containing a gasket 40.

A gland nut 41, having internal threads which engage with external threads 42 on the top of pump cylinder 5, fits into the groove containing gasket 40. When the gland nut 41 is screwed down on the threads 42 on the pump cylinder 5 it compresses the head elements 36 and 37 against the top of the casing 33, which is itself threaded to the base 32. If desired, the casing 33 may be only seated against the base 32 as it is seated against the head 36, in which case the seal at gasket 34 will be due to the pressure of gland nut 41. The gaskets 35, 39 and 40 provide sealing means as will be understood. The gland nut 41 thus holds the casing 33, base 32 and the upper and lower head members 37 and 36 of the main filter unit 1 in assembled relationship.

As shown in Fig. 1 the base 32 has a tapered bore 43 in axial alignment with the bore of the pump cylinder 5. Seated in the bore 43 is a valve 44 having a mating tapered portion 45. At the bottom of the tapered portion 45 the valve 44 has an annular flange 46 having a tapered underside. As shown in Figs. 5 and 1, a U-shaped retainer pin 47 which slides in parallel holes 48 and 49 in the base 32 and aligned with the tapered underside of flange 46, slips under flange 46 and resiliently urges and retains the valve 44 in the tapered bore 43. The resilience of this force is due to the fact that the retainer pin 47 is of spring material. The annular flange 46 lies within an annular recess 50 in the base 32, and as shown in Figs. 5 and 1 the walls of this recess do not permit the legs of the retainer pin 47 to be spread out sufficiently to slip out from under the flange 46. A recess 47a is provided in the base so that the portion connecting the legs of the pin 47 is accessible for removal of the pin from the base.

The valve 44 terminates in a base having substantially the same outside diameter as the base 32. As shown in Fig. 1 the base of valve 44 has an upper annular shoulder 44a seating within a mating internal shoulder in the bottom of the base 32. The base of valve 44 further has external threads 51 which mate with the internal threaded portion 11 of the pre-filter unit 2. A second U-shaped pin 52 has its two legs passing through parallel holes in the base of valve 44. When the pin 52 is pushed completely into the holes, its connecting portion which joins the two legs is seated in a recess 52a below the roots of the threads 51, so that it will not interfere with threading the pre-filter unit onto the threads 51 when the equipment is not in use, the recess being large enough to allow the connecting portion to be engaged by a tool or finger. The holes in which the legs of the pin 52 slide have portions of small and larger diameter and the ends of the legs are split or upset to keep pin 52 from being pulled entirely out, in a similar manner as the wire extensible handles of Fig. 4 are mounted, as will be described later in connection with Fig. 4. The U-shaped pin 52 has a dual purpose when it is pulled out of its recess so that it projects from the side of the base of valve 44. The first and primary purpose is to provide a handle with which to rotate the valve 44 for a purpose to be described. The secondary purpose is to provide a foot rest to hold the main filter unit 1 in place on the ground when operating the pump to filter water.

The valve 44 has within it the ball check valves 6 and 7, both of which are spring pressed into closed position as shown in Fig. 1. Valve 6 permits one way flow into the pump cylinder 5 by way of the passage 53 in valve 44. Valve 7 permits one way flow out of the pump cylinder 5 by way of the passage 54 in valve 44. These passages 53 and 54 pass through the side walls of the tapered portion 45 of valve 44 in the same plane, and 180 degrees apart. When in the position of Fig. 1, passage 53 communicates with an inlet passage 55 in the base 32 which connects with inlet fitting 31. At the same time the passage 54 in the valve communicates with an outlet passage 56 which terminates in an annular channel 57 to distribute the water evenly around the inside of the main filter unit. With the valve 44 in this position, when the pump shaft 4 is pulled up the pump cylinder will be filled with water which has passed through the pre-filter unit 2 and the check valve 6. On the down stroke of the pump the check valve 7 opens and permits the discharge of the water from the pump cylinder 5 into the main filter unit by way of outlet passage 56 and channel 57.

When it is desired to backwash the pre-filter unit the pump cylinder is first filled with water while the valve 44 is in the position of Fig. 1. The handle 52 is then pulled out and the valve 44 is rotated 180 degrees until passage 54 aligns with passage 55 and passage 53 aligns with passage 56. Then when the pump shaft 4 is pushed down, the water in the cylinder 5 is discharged through valve 7, passage 55 and hose 3 and backwards through the filtering material in the pre-filter unit 2 to backwash it. The pump cylinder 5 may be refilled for more backwashing strokes by pulling the pump shaft up again while the interior of the casing 33 is vented to the atmosphere at the top as through the fitting 8 and hose 9. The filtering material, such as diatomaceous earth, used in the pre-filter unit will be slightly packed against the screens 21 and 22 during normal filtration, and will thus form a pre-coat upon the screens 21 and 22. This pre-coat, however, will not be cracked and broken by ordinary shocks as will those types of pre-coats which are built up on a support by mixing diatomaceous earth, for example, with the influent liquid so as to gradually build up on the support as filtration proceeds. In my device the pre-coat of diatomaceous earth is already built up on the support when filtration begins, since it is confined between two screens. Yet it is packed loosely enough between the screens so that backwashing will disturb and clean it, as well as any particles retained by the outer screens 20 and 23. A stop pin 58 mounted on the valve 44 moves in an arcuate slot 59 (Fig. 5) in the bottom of the base 32 and since the slot extends for only 180 degrees, the valve 44 is limited to a 180 degree movement, by which means the passages 53—56 are properly lined up at the end of the rotative movements of valve 44.

An annular ring 60 has a central bore which slides over the pump cylinder 5. On its upper surface the ring 60 has a plurality of blind holes or seats into which are cemented the lower ends of one or more annular rows of ceramic filtering tubes 61. The lower head element 36 has similar seats on its bottom surface in axial alignment with the seats in the ring 60, the upper ends of the filtering tubes 61 being seated and cemented therein. The central bores of the tubes 61 communicate with an annular groove 62 on the upper side of the head 36 by means of holes 63 passing through the head.

A corresponding annular groove 64 in the underside of the upper head 37 overlies the annular groove 62. The effluent fitting 8 communicates with the groove 64. A screen 65 is soldered or otherwise fixed over the groove 64 to prevent the passage of particles of activated carbon or the like into the effluent fitting 8, the bores of the filtering tubes 61 being normally filled with activated carbon which has been silvered, as will be described later.

The space within the casing 33 and between the filtering tubes 61 is also normally filled with silvered activated carbon, there being a filling hole 66 passing through the base 32 and closed with a screw plug 67. In order to prevent the passage of carbon particles into the valve 44 from the casing 33 a screen 68 is placed either in the passage 56 or over the annular channel 57.

In order to keep the pump shaft 4 from being pulled out of the cylinder 5 at the end of an up stroke the diameter of the shaft 4 is slightly less than the internal diameter of the cylinder 5; the central bore of the gland nut 41 having a sliding fit on the pump shaft 4, so that the washer assembly 69 which has a sliding fit in cylinder 5 will not permit the pump shaft 4 to be pulled out of the cylinder 5. The washer assembly 69 includes a central metal washer having a sliding fit within cylinder 5 and separating the opposed flexible cup washers which are pressed against the wall of the cylinder 5 by means of expanding internal spring washers 70.

When the equipment is not in use the pre-filter 2 will be attached to the main filter unit 1 by means of the mating threads 11 and 51 as described above. In order to get the flexible effluent hose 9 out of the way it is coiled around the pump shaft and gland nut as shown in Fig. 2. With the pump shaft in its down position the hose 9 is retained in its coiled position by means of the downwardly turned end portions 71 of the wire extensions on the handle 72.

The end portions 71 are the ends of wire handle extensions shown more clearly in Fig. 3. Each extension is made of one piece of wire having its ends sliding in holes 73 and 74 in the handle 72. In the embodiment of Fig. 3 the holes 73 and 74 are slightly larger in diameter than the wire, which has projections 98 seating in internal recesses 99 in the bores 73 and 74. The projections engage in the recesses due to the natural spring of the wire and will retain the wire handles in either the closed position shown in Fig. 3 and in the solid lines of Fig. 1, or in the extended position indicated by the broken lines in Fig. 1. With the wire handles in the extended position a larger handle and a better grip is available than when using only the solid handle 72.

In Fig. 4 another embodiment of the extendible wire handles is shown. In this case when they are in closed position the straight or leg portions extend substantially through the length of the handle 72. Four holes are necessary in this embodiment. Substantially one-half of each hole is the same diameter as the wire which has a sliding fit therein. In each case this is that portion of the hole near the bent mid portion of the wire. The remaining portion of each hole, near the straight end portions of the wire, are of larger diameter. The ends of the wires are upset or spread so that they slide in the larger portions of the holes but are stopped when they reach the small diameters as the wire handles are pulled out. With this embodiment the wire extensions are stronger than those of Fig. 3 since even in extended position substantially half of their length still have a bearing portion within the handle 2.

The top surface of the gland nut 41 has a circular row of projecting lugs 75 best shown in Figs. 2 and 1. The lower surface of the handle 72 has a mating circular row of projecting lugs 76 which fit between the lugs 75 when the handle 72 is at the bottom of its stroke. By means of these mating sets of lugs the handle 72 can be used as a wrench to tighten or loosen the gland nut 41. When loosened, the gland nut can be entirely disengaged from the threads 42 on the top of pump cylinder 5. The entire assembly of filtering tubes 61 can then be removed from the case 33 by lifting the assembly comprising the upper head 37 and the lower head 36 from the top of the casing 33, since the filtering tubes 61 are cemented to the lower head 36 and the annular ring 60 will slide over the pump cylinder. With the filter tube assembly thus removed from the casing 33 the exterior surfaces of the tubes can be cleaned with a brush or other means to renew the filtering rate. The tubes may also be advantageously cleaned with cleaning or oxidizing chemicals which will better clear the outer pores of the ceramic filter tubes. When reassembling the tubes in the case 33 any activated carbon which was in the case will have to be removed first, and then reinserted into the casing through the filling hole 66 after the main filter unit 1 has been reassembled.

In order to facilitate the disassembly of the upper head 37 from the lower head, the upper head is provided with means such as diametrically spaced lugs 77 and 78 which may be engaged by a wrench to loosen the upper head.

The pump shaft 4 is hollow to provide a storage space for one or more vials 79. A screw plug 80 closes the open upper end of the shaft to retain the vials therein. The vials contain chemicals which may be in pill or capsule form 81, and are thus readily available to make a cleaning or oxidizing solution to clean the filter tubes as described. It is desirable that the pre-filter unit be treated with a cleaning or oxidizing agent from time to time. This is done by dissolving a suitable number of pills 81 in a vessel of water. Then the pre-filter unit can be washed back and forth in the treated water, and some of the water should be drawn through the pre-filter by operating the pump. The chemicals should finally be washed out by pumping other water through the pre-filter, either in the normal direction or by backwashing. If the water should need chemical purification some of the pills carried in the vials may be of a type useful in the chemical purification of water.

In order to reduce the weight of the equipment and to make the filtering tubes 61 visible, the case 33 is advantageously made of a transparent plastic. When the filtering tubes are visible in this manner their condition can be observed and it can more readily be determined whether or not they need cleaning.

The activated carbon used within and between the filtering tubes 61 is advantageously coated or treated with very fine particles of silver such as colloidal silver. The action of this colloidal silver on the effluent will be either oligodynamic or germicidal and insures complete sterilization of the effluent in addition to the deodorizing and degustating action of the activated carbon. The silver particles are so small as to be embedded or adsorbed in the pores of the activated carbon and will not normally be dislodged by the water flow through the carbon.

The invention described herein may be manufactured and used by or for the Government of the United States of America for governmental purposes without the payment of any royalties thereon or therefor.

I claim:

1. A filtering apparatus comprising a casing containing filtering elements and a pump operable to force liquid through said elements, said pump having a reciprocable shaft with a transverse handle at the top portion; extensible means on said handle having downturned end portions; a flexible effluent conduit at the top of said casing adapted to be coiled about said top when not in use, said downturned end portions of said extensible means being operable to retain said conduit in said coiled condition.

2. A filter unit comprising a base having a tubular extension forming a pump cylinder; a cylindrical casing seated on said base and surrounding said extension; a lower head member seated on the top of said casing; an upper head member seated on said lower head member and engaging said extension; a gland nut having threaded engagement with the top of said extension and operable to compress said head elements and said casing against said base; filter elements within said casing and fixedly attached to said lower head element; said base being provided with valve means admitting fluid to said pump cylinder and from said pump cylinder to the interior of said casing, said head elements being provided with an outlet permitting the discharge from said casing of fluid which has passed through said filter elements; and a reciprocable pump shaft within said cylinder and having an exterior handle.

3. The apparatus described in claim 2 wherein said handle has means operable to engage said gland nut when said shaft is at the bottom of its stroke, to tighten or loosen said gland nut on said pump cylinder.

4. The apparatus described in claim 2 wherein said outlet means comprises a flexible conduit adapted to be coiled on the top of said upper head member and said handle has downturned portions operable to retain said coiled conduit in place when said apparatus is not in use and said pump shaft is at the bottom of its stroke.

5. In the apparatus described in claim 2, a pre-filter unit having its outlet connected to said valve means, said valve being of the plug type; an annular tapered flange on the side of said valve, a removable retainer pin having a pair of legs passing through said base and resiliently pressing against said tapered flange to retain said valve in its seat; and a handle operable to rotate said valve, said handle having leg portions sliding in passageways in said valve whereby it may be pushed out of the way into the body of said valve.

6. A liquid purifying apparatus comprising a substantially cylindrical casing; a base closing the bottom of said casing and having a fluid inlet; means in said casing forming a pump cylinder extending vertically from said base; a passage in said base having a check valve therein, connecting the lower end of said cylinder to said fluid inlet; a reciprocable piston in said cylinder; a second passage in said base forming a fluid outlet connecting the lower end of said cylinder with the interior of said casing; a head member closing the top of said casing, said piston having a piston rod projecting through said head member; at least one annular series of vertical ceramic filtering tubes attached at their upper ends to said head member, the lower ends of said tubes being closed; a discharge passageway in said head member communicating with the interior of said tubes at their upper ends.

7. The device described in claim 6 wherein said hollow filtering tubes are filled with silvered activated carbon.

8. A liquid purifying apparatus comprising a pre-filter having an inlet and an outlet; a main filter having an inlet and outlet; a pump cylinder extending centrally of said main filter unit and having an inlet and outlet with check valves therein; a piston reciprocable in said cylinder and operable through a suction and a pressure stroke; and a common reversible valve means including a stationary element and a reversibly movable element the latter of which is provided with cylinder inlet and outlet passages having check valves therein, a port in said stationary element in communication with the prefilter outlet and normally registering with said cylinder inlet passage, and with said cylinder outlet passage when said movable element is reversed, a second port in said stationary element in communication with the main filter inlet and normally registering with said cylinder outlet passage, and with said cylinder inlet passage when said movable element is reversed.

9. A liquid purifying apparatus comprising a prefilter unit and a main filter unit; a pump cylinder mounted within and extending centrally of said main filter unit and having an inlet and an outlet; a reciprocable piston in said cylinder. said piston having a suction and a pressure stroke; a base on said main filter unit having a first passageway connected to the discharge of said prefilter unit and a second passageway connected to the inlet of said main filter unit; a rotatable valve in said base having first and second conduits which when the valve is in one position are connected at one end to the inlet of said cylinder and at their other ends to said first and second passageways respectively, and when the valve is in another position are connected to said second and first passageways respectively; and check valve means in said conduits arranged to prevent the flow of fluid from said cylinder through said first conduits and to prevent the flow of fluid from said main filter to said cylinder.

10. A filter unit comprising a base, a central tubular extension on said base to form a pump cylinder; a cylindrical casing attached to said base and surrounding said extension; a lower head member seated on the top of said casing; an upper head member attached to said lower head member; a gland nut having threaded engagement with the top of said extension and operable to compress said head elements against the top of said casing; filter elements within said casing and means attaching them to said lower head element; valve means operable to admit fluid through said base to said pump cylinder and from said pump cylinder to the interior of said casing, said head elements being provided with an outlet permitting the discharge from said casing of fluid which has passed through said filter elements; and a reciprocable pump shaft within said cylinder and having an exterior handle.

11. In a liquid purifying apparatus; a closed casing having a fluid inlet and outlet, a pump within said casing, means for operating said pump projecting through a wall of said casing; said pump having an inlet conduit connected to said fluid inlet and an outlet conduit discharging the fluid into the space between said pump and the inside walls of said casing in response to operation of said operating means; a plurality of filtering tubes bodily spaced from said pump, disposed in said space between the pump and the inside wall of said casing and having their outer surfaces exposed to the liquid in said space, the bores of said tubes being closed at one end and connected at the other end to said fluid outlet, thus providing a compact arrangement with a maximum amount of filtering wall area in said space.

12. The combination defined by claim 11 wherein said pump comprises a cylinder and said operating means comprises a piston rod reciprocable therein.

13. In a liquid purifying apparatus; a closed casing having a fluid inlet and outlet, a pump within said casing. means for operating said pump projecting through a wall of said casing; said pump having means associated therewith for receiving liquid from said inlet and discharging same into the space between said pump and the inside walls of said casing in response to said operating means, a plurality of filtering tubes disposed within said space, the outer surfaces of said filtering tubes being exposed to the liquid in said casing and their bores being in communication with said outlet.

14. In a liquid purifying apparatus, a casing having a base member with an inlet conduit therein, a head member with an outlet conduit therein and a peripheral wall, said members being separable from said wall, a plurality of hollow filtering elements within said casing held between said members having their hollows communicating with said outlet conduit, a pump operable to force liquid from said inlet conduit through the walls of said elements into said hollows and out through said outlet conduit, said pump having a cylinder in said casing secured to said base member, and extending through said head member, said pump having an inlet connected to said inlet conduit and an outlet connected to the inside of said casing, a gland nut having threaded engagement with the top of said cylinder and operable to compress said members against the ends of said peripheral wall to make said casing fluid tight and to facilitate assembling and dismantling of said apparatus.

15. In a liquid purifying apparatus of the type defined in claim 14, a plunger in said pump cylinder having a rod extending on the outside of said head member, an operating handle on said rod, and means on the underside of said handle for cooperation with said gland nut when the plunger is pushed in, to turn said nut.

16. In an apparatus as defined in claim 15, a prefilter element for use in connection with said apparatus having means for connection to said inlet conduit to supply the pump with prefiltered fluid, said element having attachment means for fixing it to the base member of said casing for ease in carrying the complete filtering unit.

17. In a filtering unit as defined in claim 16, inlet and outlet connections for said pump cylinder with check valves therein normally communicating with said inlet conduit and said casing outside said hollow elements respectively, a reversible valve means in said base member for reversing the inlet and outlet connections to said pump cylinder to reverse the direction of flow of fluid through said unit for flushing said filtering elements when said valve means is reversed.

18. In a device having a reciprocally operated rod, an operating handle therefor and a bearing sleeve for said rod, a gland nut on the end of said bearing sleeve having means cooperating with interfitting means on the under side of said handle for turning said nut with said handle when said rod has been pushed inwardly.

DAVID H. QUINN.

REFERENCES CITED

The following references are of record in the file of this patent:

UNITED STATES PATENTS

| Number | Name | Date |
|---|---|---|
| 289,980 | Chevallot | Dec. 11, 1883 |
| 290,258 | Miller | Dec. 18, 1883 |
| 456,119 | Manwaring et al. | July 14, 1891 |
| 629,387 | Nordtmeyer | July 25, 1899 |
| 683,061 | Nordtmeyer | Sept. 24, 1901 |
| 888,469 | Case et al. | May 26, 1908 |
| 963,767 | Jarvis | July 12, 1910 |
| 1,535,112 | Duke et al. | Apr. 28, 1925 |
| 1,607,989 | Knight | Nov. 23, 1926 |
| 1,914,829 | Imhoff et al. | June 20, 1933 |
| 2,153,062 | Harlan et al. | Apr. 4, 1939 |

FOREIGN PATENTS

| Number | Country | Date |
|---|---|---|
| 6,077 | Great Britain | Mar. 20, 1899 |
| 6,793 | Great Britain | Mar. 21, 1907 |
| 6,876 | Great Britain | Mar. 31, 1905 |
| 198,700 | Switzerland | Dec. 1, 1938 |